March 5, 1963  F. MARZILLIER  3,079,637
APPARATUS FOR PRODUCING HOLLOW ARTICLES
Filed Sept. 19, 1961  7 Sheets-Sheet 1

Inventor
FREDERICK MARZILLIER

By Jucke & Jucke
Attorney

March 5, 1963 F. MARZILLIER 3,079,637
APPARATUS FOR PRODUCING HOLLOW ARTICLES
Filed Sept. 19, 1961 7 Sheets-Sheet 2

Inventor
FREDERICK MARZILLIER
By Fucke & Fucke
Attorney

March 5, 1963 F. MARZILLIER 3,079,637
APPARATUS FOR PRODUCING HOLLOW ARTICLES
Filed Sept. 19, 1961 7 Sheets-Sheet 5

Inventor
FREDERICK MARZILLIER
By Lucke & Lucke
Attorney

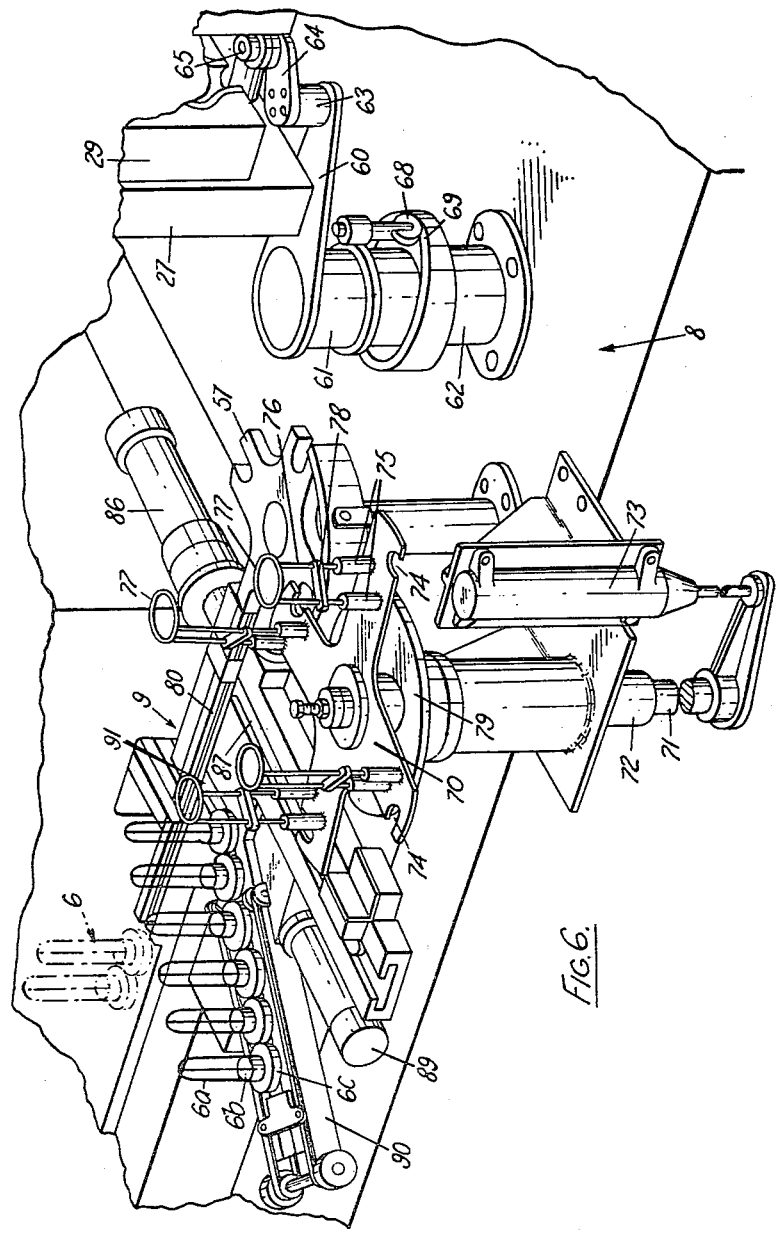

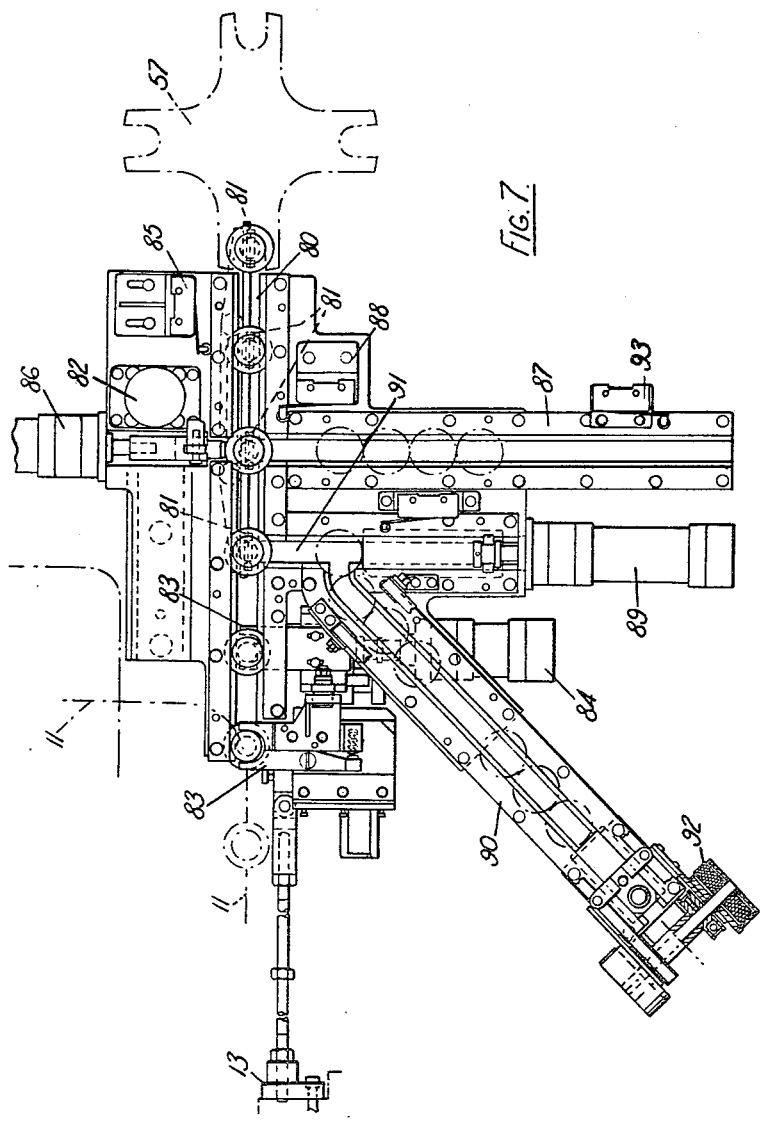

United States Patent Office 3,079,637
Patented Mar. 5, 1963

3,079,637
APPARATUS FOR PRODUCING HOLLOW
ARTICLES
Frederick Marzillier, Reading, England, assignor to Marrick Manufacturing Co., Limited, Reading, England, a British company
Filed Sept. 19, 1961, Ser. No. 139,200
11 Claims. (Cl. 18—19)

This invention concerns the production of hollow moulded articles, such as bottles, from thermoplastic materials, in particular from so-called "rigid" PVC. An object of the invention is to provide an improved means for producing single and multi-walled hollow articles from thermoplastic materials.

The invention includes apparatus comprising means for heating a series of discrete lengths of thermoplastic tubing to moulding temperature, means for transferring such heated tubing lengths successively to a mould, means for introducing fluid under pressure into a tubing length within such mould to expand said tubing length into conformity with the mould configuration, and means for removing the expanded tubing length from such mould following cooling of the expanded tubing length therein.

Since cooling of each tubing length in the mould to a sufficiently rigid state to retain the moulded configuration occupies an appreciable period of time, the apparatus of the invention desirably includes a plurality of moulds into which successive heated lengths of tubing are introduced in sequence for expansion and subsequent cooling, whereby introduction and expansion of a succeeding tubing length in one mould can be accomplished whilst the preceding expanded cooling length is cooling in its mould.

Thus, in a preferred embodiment of the apparatus in accordance with the invention, a plurality of moulds is arranged in a circle on a turret or table adapted to bring each mould successively into a loading position for introduction of heated tubing lengths into the mould, rotation of the turret or table eventually carrying such mould to an unloading position for removal of the cooled expanded tubing length from the mould.

An embodiment of the invention is illustrated by way of example in the accompanying drawings in which:

FIGURE 6 is a fragmentary perspective view showing the mould unloading station of the apparatus and the arrangements for stripping an expanded tubing length from a mandrel; and FIGURE 7 is a plan view of the mandrel return and replacement mechanism shown in FIGURE 6.

Figure 1:
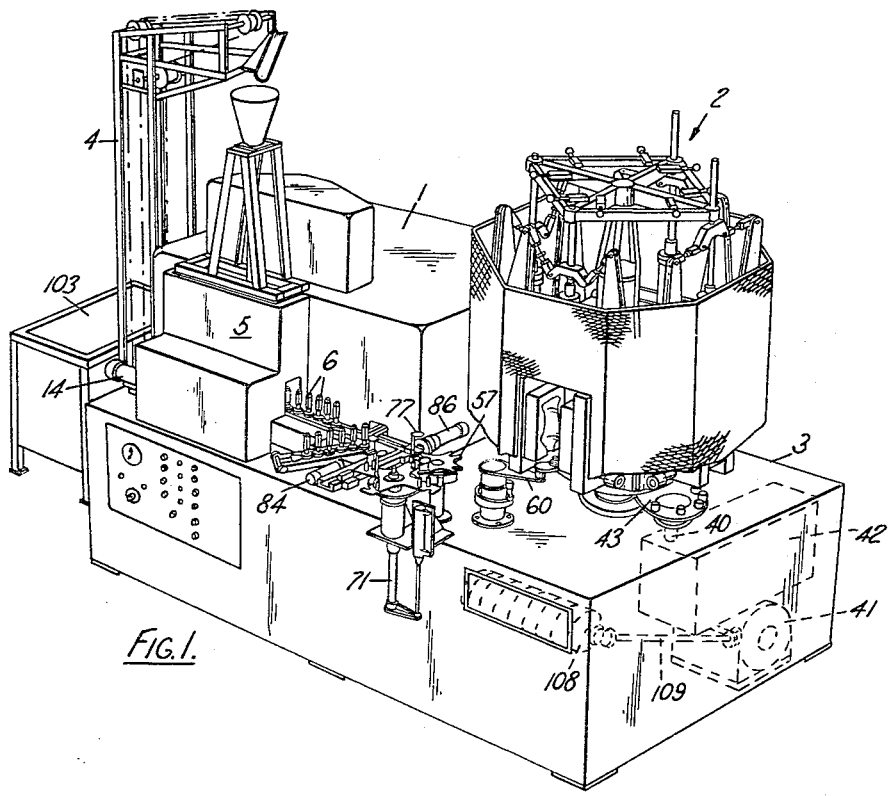
FIGURE 1 is a perspective, somewhat diagrammatic, view of apparatus in accordance with the invention.

Referring to the drawings, the apparatus shown therein is adapted to the production of hollow thermoplastic articles in the form of bottles and comprises two main units, namely an oven 1 for heating a succession of discrete lengths of thermoplastic tubing each supported on an individual mandrel, and a mould turret generally indicated at 2 and equipped with a plurality of moulds (four in the present case) which are successively loaded with heated lengths of thermoplastic tubing as the mould turret rotates to bring each mould successively into a loading position.

The oven 1 and mould turret 2 are both mounted upon a suitable supporting framework enclosed by a housing 3.

The illustrated apparatus further comprises a tube feeder 4 which feeds discrete lengths of thermoplastic tubing successively to mandrel loading device 5 that loads the successive tubing lengths on to individual vertically disposed mandrels 6.

The apparatus further comprises a mould loader 7 (FIGURES 2 and 3) for transferring heated tubing lengths with their mandrels 6 from the oven 1 to the moulds of the mould turret 2, a mould unloader and mandrel stripper assembly 8 (FIGURES 1, 4 and 6) and a mandrel return and replacement mechanism 9 (FIGURES 6 and 7).

The apparatus further includes drive means for rotating the mould turret 2 and for advancing loaded mandrels through the oven 1 and various control means, all hereinafter described.

The oven 1 of the apparatus comprises an enclosure housing suitable heating means such as electric resistance elements (not shown) and fan or like means (not shown) for circulating the atmosphere within the enclosure so as to achieve a substantially uniform atmosphere temperature within the enclosure. Suitable control means are provided to maintain the atmosphere within the oven at a desired temperature.

As noted, discrete lengths of thermoplastic tubing are loaded on to individual mandrels by the mandrel loading device 5 and then carried on their respective mandrels 6 into the oven 1 so that the tubing lengths are heated to moulding temperature in the oven. The mandrels 6 may be of any convenient form appropriate to the configuration of the article to be formed but conveniently each mandrel 6 comprises a pair of inverted hairpin-shaped wire loops 6a mounted in mutually perpendicular planes on tubular boss 6b which is in turn mounted in a peripherally flanged collar 6c. The boss 6b extends below the collar 6c and its bore terminates in a bellmouth for co-operation with a nipple on the mould turret by which air under pressure may be fed through the bore of the boss 6b to the bore of a tubing length supported by the mandrel.

Figure 3:
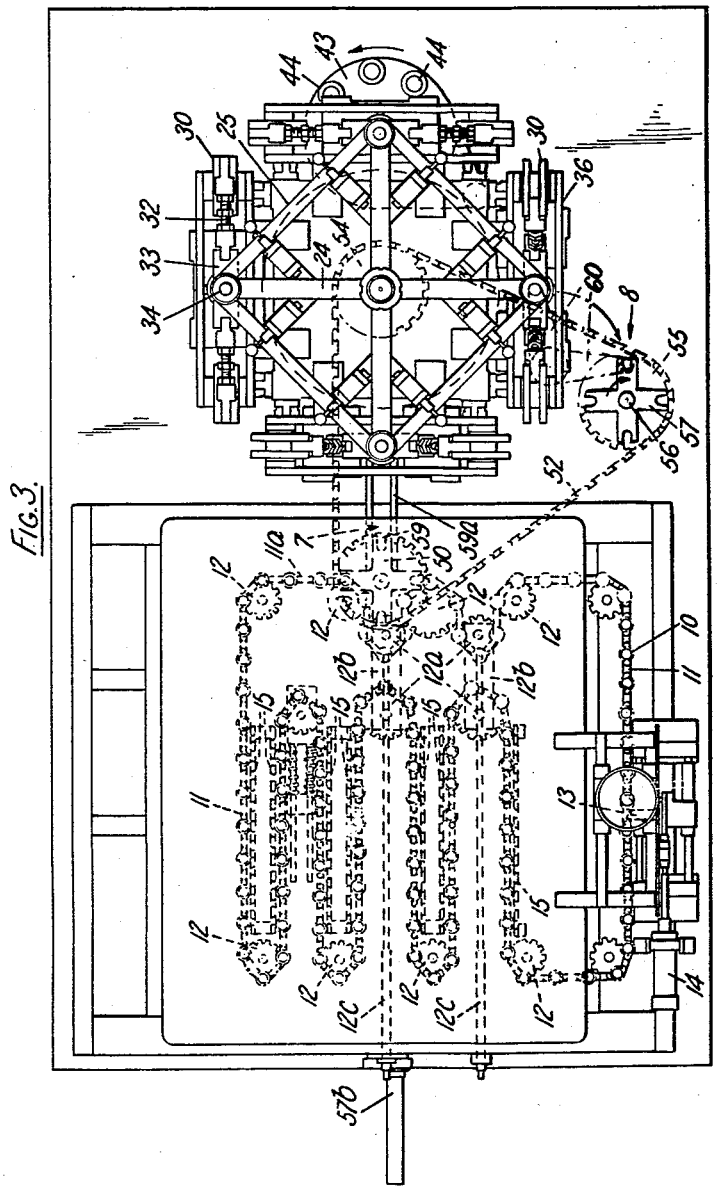
FIGURE 3 is a plan view of the apparatus of FIGURE 1.

Mandrels 6, except when supporting a tubing length within a mould of the mould turret and during stripping of a moulded article from a mandrel, are individually supported by mandrel carriers 10 arranged at regular intervals on a conveyor in the form of a chain 11 which is guided over a series of sprockets 12 so that the chain has a run extending externally of the oven 1 through the loading device 5. Apart from the run of the chain 11 extending through the device 5, the remainder of the chain 11 is within the oven 1 and follows a sinuous path therein. The chain is intermittently advanced by the spacing of successive mandrel carriers 10 thereon by means of a ratchet device 13 adjacent to the loading device 5 and operated by a piston and cylinder assembly 14. As seen in FIGURE 3, the chain 11 is advanced to the left through the loading device 5, the loaded mandrels leaving the latter and carried by the chain 11 entering the oven 1 through an opening 1a in the oven wall.

The mandrel carriers 10 comprise rotatably mounted bushes that receive the lower ends of the bosses 6b of the mandrels 6 and said bushes have peripheral sprocket teeth (not shown) that engage with roller chains 15 arranged alongside section of the path of chain 11 within the oven 1 so that, as the chain 11 advances, the carriers 10, and hence the mandrels supported thereby, are rotated to assist uniform heating of the tubing lengths by the atmosphere within the oven.

The mould loader 7 removes successive mandrels 6 from their carriers 10 on the chain 11, in a manner hereinafter explained, for transfer to the moulds of the mould turret 2. From the mould loader 7 the chain 11 follows a path to an opening 1b in the oven wall where the chain emerges from the oven at the start of the run through the loading device 5.

It will thus be understood that within the oven there is a section of chain 11, extending from opening 1a to the mould loader 7, carrying mandrels and tubing lengths thereon, and another section of chain 11, extending from the mould loader 7 to the opening 1b, which does not carry any mandrels. Means are provided for adjusting the relative lengths of these two sections of the chain 11 so as to determine the number of mandrels within the oven at any instant and thus to determine, for a given rate of advance of chain 11, the residence time of any particular mandrel within the oven during its transit from opening 1a to the mould loader 7.

These adjusting means comprise two pairs of sprockets 12a each of which pairs of sprockets is adjustable across the oven to determine the relative sizes of loops in the chain in the two aforesaid sections thereof. The pairs of sprockets 12a are each mounted upon an individual carriage 12b which is slidable in an individual guide (not shown) and the position of which is adjustable by means of an individual screw-threaded rod 12c extending to the exterior of the oven. FIGURE 3 shows carriages 12b in positions such that the pairs of sprockets 12a thereon cause the chain 11 to follow a path including extensive loops in that section which extends from opening 1a to the mould loader 7 and small loops in that section which extends from the mould loader 7 to the opening 1b. It will be apparent that adjustment of either carriage 12b to the left as seen in FIGURE 3 will result in a smaller loop of chain being formed in the section in advance of the mould loader 7 (and a correspondingly larger loop being formed in the section succeeding the mould loader 7) and a reduction in the number of mandrels within the oven at any instant.

The mould turret 2 of the illustrated apparatus comprises a central shaft 20 journalled for rotation about a vertical axis in suitable bearings in the frame of the apparatus, the shaft 20 terminating in a circular table 21 upon which is mounted a square box like structure 22 in turn supporting a central column 23, the upper end of which carries a spider 24 constituting diagonals of rectangular frame 25. The diagonals of the frame 25 are indexed at 45° to the diagonals of the box-like structure 22.

Each of the four sides of the structure 22 carries a mould assembly 26 that comprises a pair of parallel vertically disposed platens 27 which are slidable on horizontal guides 28 extending parallel with the faces of the structure 22 and near the upper and lower ends thereof, the guides 28 serving to guide the movement of the platens 27 towards and away from one another in parallelism.

The pair of platens 27 of each mould assembly 26 carry the respective halves of a split mould 29 adapted to the configuration of the moulded article to be produced by the apparatus. The platens 27 have external passages for circulation of cooling fluid, such as water, via connections and conduits (not shown) extending throught the shaft 20 to a suitable regulating arrangement (not shown) by which the platens and moulds are maintained at an appropriate temperature.

Figure 4:
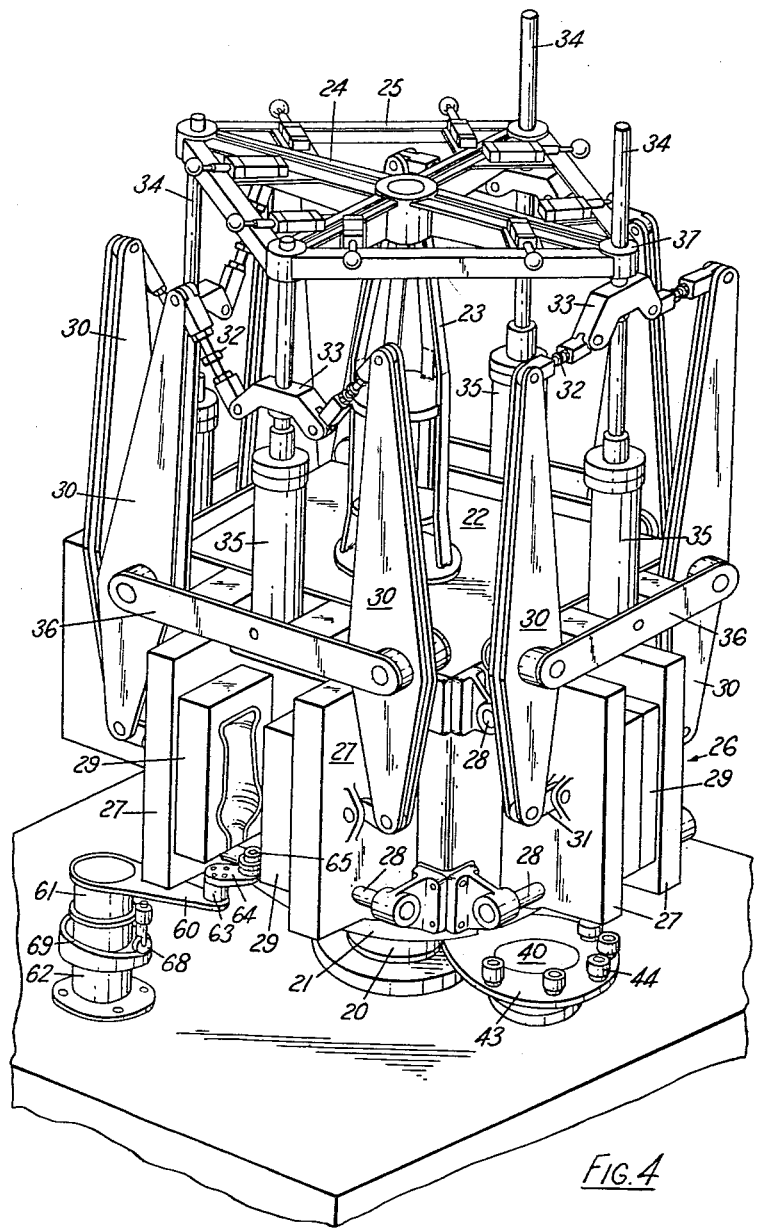
FIGURE 4 is a perspective view of the mould turret of the apparatus of FIGURE 1.

The platens 27 of each mould assembly 26 are moved towards and away from one another to open and close the respective moulds by means of a toggle linkage comprising a rocking lever 30 for each platen, this rocking lever 30 having its lower end articulated through a connecting link 31 to the associated platen and its upper end articulated through an adjustable connecting link 32 to a crosshead 33 on the piston rod 34 of a vertically disposed piston and cylinder assembly 35. The piston and cylinder assembly 35 is supported by the structure 22 and the rocking levers 30 are each pivoted between their ends to a connecting link structure 36 carried by the structure 22. The piston rods 34 of the respective assemblies 35 extend through bushes 37 at the corresponding corners of the frame 25 for guided vertical reciprocation in such bushes and as will be apparent from an inspection of, for example, FIGURE 4, actuation of a piston and cylinder assembly 35 will be effective to swing the rocking levers 30 to cause opening and closing of the moulds of the platens 27 associated with such rocking levers. FIGURE 4 shows two of the mould assemblies 26 in their open condition with the respective piston and cylinder assemblies 35 retracted, and the other two of the mould assemblies 26 in their closed condition with their respective piston and cylinder assemblies 35 extended.

The mould turret 2 is intermittently rotated through angular distances of 90° by means of a Geneva stop motion arrangement comprising a vertical driving shaft 40 driven by an electric motor 41 through the medium of a speed reduction gear box 42. The upper end of shaft 40 carries an eccentric plate 43, the upper surface of which carries driving pegs in the form of rollers 44 that engage in grooves in the under-face of the table 21 in such manner that constant rotation of the shaft 40 causes the desired indexing of the table 21, and thus of the turret 2, with a dwell in each indexed position of the turret.

Figure 5:
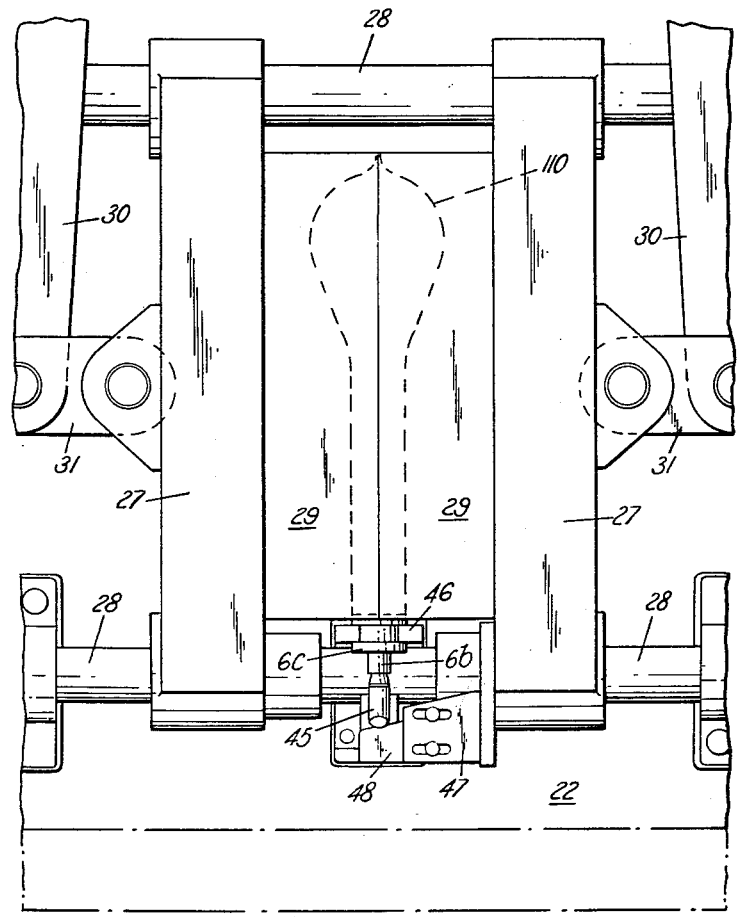
FIGURE 5 is a fragmentary sectional view of a mould of the turret, this figure showing the mould closed and a heated tubing length therein in the course of expansion into conformity with the mould configuration.

Referring to FIGURE 5, it will be seen that the structure 22 of the turret 2 is furnished below each mould assembly 25 with a nipple 45 on a swinging arm such that the nipple may swing in a vertical plane into and out of engagement with the lower end of the bore of the boss 6b of a mandrel 6 in position for expansion and moulding of a tubing length carried by the mandrel in the mould 29 of such assembly. The structure 22 further carries a jaw 46 above each nipple 45, the jaw 46 engaging the collar 6c of a mandrel as aforesaid to support such mandrel in the required position with respect to the mould 29.

Moreover, one of the two platens 27 of each mould assembly is equipped at its lower end with a lug 47 that carries a cam 48 having an inclined upper surface, the cam 48 being adjustably mounted on the lug 47 so as to be movable towards and away from the platen 27 carrying the lug 47. The cam 48 is positioned to move under the nipple 45 as the platens 27 of a mould assembly approach to close the mould 29 carried thereby, such engagement of the nipple 45 by the cam 48 swinging the nipple upwardly to engage the mandrel boss 6b.

Thus, during closing of a mould about a tubing length supported by a mandrel which is in turn carried by the associated jaw 46 on the structure 22, the nipple 45 is swung upwardly into sealing engagement with the mandrel boss 6b to provide a connection for supplying air under pressure through the nipple to the interior of the tubing length on the mandrel for expanding such tubing length into configuration with the mould 29 carried by the platens 27.

The drawings show the mould turret 2 in the static dwell position it adopts between successive indexing movements caused by the rotation of the driving shaft 40 in the manner hereinabove explained. It will be seen that in this position of the turret one of the mould assemblies 26 faces the adjacent wall of the oven 1 and the mould loader 7. A mould assembly in such position is referred to herein as being at the mould loading station. The direction of rotation of the turret 2 is clockwise as seen in FIGURE 3 and a mould assembly positioned at the front of the apparatus (i.e. adjacent to the mould unloader and mandrel stripper assembly 8) is referred to hereinafter as being at the mould unloading station.

At the loading station, each mould assembly is loaded with a mandrel supporting a heated tubing length and at the unloading station the mandrel carrying the expanded and cooled tubing length is removed from the mould assembly so as to free the latter to accept another mandrel and heated tube when such mould assembly again comes into the loading station.

The mould loader 7 effects mould assembly loading at the loading station and comprises a cruciform star-wheel 50 the arms of which terminate in slots to form jaws. The star-wheel 50 is arranged on a driving shaft 51 which is rotated in synchronism with the turret 2 by means of a chain drive comprising a chain 52 that extends around a sprocket 53 on the driving shaft 51, a sprocket 54 on the turret shaft 20 and a sprocket 55 on the driving shaft 56 of a cruciform star-wheel 57 of the mandrel stripper of the assembly 8. The arrangement is such that the star-wheels 50 and 57 rotate through 90° with each corresponding rotation of the turret 2 and the phase relation of the star-wheels to the turret position is as shown in FIGURE 3.

The driving shaft 51 of the star-wheel 50 is adapted to be lifted vertically immediately prior to each 90° of rotation of the star-wheel and to be lowered to its original level following such rotation, these vertical displacements being effected by means of a piston and cylinder assembly 58 at the lower end of shaft 51.

As revealed by FIGURE 3, the chain 11 which moves the loaded mandrels 6 through the oven 1 has a run 11a aligned with the rearwardly directed arm of the star-wheel 50 when this is in its rest position as shown. Thus the chain run 11a moves the mandrel carriers 10 successively to a position immediately below such rearwardly directed arm of the star-wheel 50, a loaded mandrel 6 moving into such position having its collar 6c engaged by the jaw of the rearwardly directed arm of the star-wheel so that subsequent raising and rotation through 90° of the star-wheel 50, as the turret 2 indexes through 90°, results in such mandrel being lifted out of its carrier 10 and being positioned over and subsequently lowered into a mandrel transfer shuttle 59.

The shuttle 59 reciprocates in guides 59a along a line joining the axes of star-wheel 50 and turret shaft 20 to carry a mandrel, placed in the shuttle by star-wheel 50, to the jaw 46 associated with the mould assembly 26 in the loading station. Such reciprocation of the shuttle 59 is effected by a piston and cylinder assembly 59b. The operation of such assembly 59b is timed to occur whilst a mould assembly 26 at the loading station is in open condition.

At the unloading station, a mould assembly 26 is opened by retraction of its associated piston and cylinder assembly length is removed from the mould assembly and the tubing length in the form of the required moulded article stripped from the mandrel. These functions are accomplished by the mould unloader and mandrel stripper assembly 8 which comprises an unloader arm 60 at the upper end of a vertical shaft 61 mounted for rotation in a supporting sleeve 62 which is in turn mounted for vertical reciprocation in the frame of the apparatus. The extremity of the arm 60 carries a vertical stub 63 which in turn carries a lug 64 terminating in a mandrel support 65. The arrangement of the stub 63 and lug 64 is such that the support 65 is positioned beneath a mandrel carried by the jaw 46 associated with a mould assembly 26 at the unloading station when the arm 60 is in the position shown in the drawings.

The unloader arm shaft 61 is movable vertically with its sleeve 62 by means of a piston and cylinder assembly 66 acting through a crank 66a and pinion 66b meshing with a rack 66c on the sleeve 62. The arm is also swingable by rotation of shaft 61 in sleeve 62 through the operation of a piston and cylinder assembly 67.

The sequence of operations of piston and cylinder assemblies 66 and 67 is such that when a mould assembly 26 reaches the unloading station and opens, the unloader arm 60 is swung by operation of assembly 67 into the position shown in the drawings and is then raised by operation of assembly 66 to cause the support 65 to engage the lower end of the boss 6b of a mandrel 6 carried by the jaw 46 associated with the mould assembly concerned. Thereafter the arm 60 is swung clockwise as seen in FIGURE 3 by operation of assembly 67 to carry the mandrel and moulded article supported thereby to engage the collar 6c of the mandrel in the slot of one arm of the star-wheel 57. In performing such swinging movement the unloader arm 60 is caused to rise by the cooperation of a roller 68 rigid with the shaft 61 and running on a cam track 69 on the sleeve 62. The sleeve 62 is then lowered by return operation of the assembly 66 to disengage the support 65 from the mandrel boss 6b, the arm 60 remaining in the swung out and lowered position thus attained until the next indexing movement of the turret has taken place.

The mould unloader and mandrel stripper assembly 8 further includes a mandrel stripper that is effective to remove, from a mandrel held by the forwardly directed arm of the star-wheel 57, the moulded article on such mandrel. The mandrel stripper comprises a cruciform star-wheel 70 that is indexed through 90° in a clockwise direction as seen in FIGURE 3 for each corresponding indexing movement of the star-wheel 57. The star-wheel 70 is carried by a shaft 71 that is splined in a sleeve 72 so as to be vertically movable therein by means of a piston and cylinder assembly 73 coupled to the lower end of the shaft 71. The sleeve 72 carries a chain-wheel (not shown) for a chain drive from the shaft 56 of the star-wheel 57.

The shaft 71 is arranged in front of the shaft 56 and is so spaced from the latter that the rearwardly directed arm of the star-wheel 70 overlies the extremity of the forwardly directed arm of the star-wheel 57 when both these star-wheels are stationary following indexing of the turret 2. The leading edges of the arms of star-wheel 70 have notches 74 that are dimensioned to engage the moulded article carried by a mandrel 6 held by the forwardly directed arm of the star-wheel 57 so that lifting the star-wheel 70 will be effective to lift the moulded article upwardly off the mandrel.

Each arm of the star-wheel 70 has a pair of upstanding tubular guides 75 for a pair of support rods 76 slidable in such guides and terminating at their upper ends in a ring 77 adapted to engage the upper end of a moulded article lifted by the star-wheel 70 from a mandrel. The rods 76 have a stop 78 that determines the extent of downward movement of the rods in the guides 75 and the lower ends of the rods are positioned over a table 79. The arrangement is such that when the piston and cylinder assembly 73 is extended, so that the star-wheel 70 is in its lowered position as seen in the drawings, the rods 75 engage the table 79 and the rings 77 are positioned at a level just above the upper end of a moulded article carried by a mandrel held in the forwardly extending arm of the star-wheel 57. On retraction of the piston and cylinder assembly 73 to raise the star-wheel 70, the rods 76 can descend through their tubular guides 75 to bring the relevant ring 77 into engagement with the upper end of the aforesaid moulded article.

The extension of the piston and cylinder assembly 73 is timed to occur immediately prior to an indexing movement of the star-wheels 57 and 70 and retraction of said assembly occurs immediately following such indexing movement. Thus it will be understood that immediately prior to such an indexing movement the star-wheel 70 will be lifted to strip a moulded article from a mandrel held in the forwardly extending arm of the star-wheel 57 whereafter the indexing rotation will carry such moulded article away from the mandrel. Following such indexing rotation, the star-wheel 70 will be lowered and this will cause release of the moulded article by lifting of the relevant rods 76 and ring 77 to enable the article to be ejected, e.g. by a blast of air through a suitably positioned nozzle (not shown).

From the foregoing description of the mould unloader and mandrel stripper assembly 8 it will be apparent that the unloader arm will effect removal of a mandrel and moulded article from a mould at the unloading station and positioning of such mandrel in an arm of the star-wheel 57. Subsequent indexing of the turret 2 and of star-wheel 57 will carry such moulded article into engagement with the notch 74 of the rearwardly directed arm of the star-wheel 70 so that such article may be stripped from its mandrel and ejected during the following indexing movement of the turret and star-wheel 70.

When a moulded article has been stripped from its mandrel by the mechanism just described, the mandrel is returned to a carrier 10 on the chain 11 for reloading with another tubing length. Such return of the mandrel is accomplished by the mandrel return and replacement assembly 9 best seen in FIGURES 6 and 7.

The assembly 9 comprises a guide 80 aligned with the path of travel of the chain 11 externally of the oven 1 through the loading device 5. This guide 80 is also aligned with the axis of rotation of star-wheel 57 and receives mandrels that have accomplished 270° indexing rotation with the star-wheel 57.

A set of four upwardly open jaws 81 is disposed beneath the guide 80 and is linked to the ratchet device 13 to reciprocate therewith. The jaws 81 are spaced apart at intervals corresponding with the spacing of the carriers 10 on the chain 11 and are vertically movable by means of a piston and cylinder assembly 82 shown in FIGURE 7 but omitted from other figures in the interests of clarity.

A further set of two horizontally disposed jaws 83 is arranged adjacent to the guide 80, these jaws being linked to the jaws 81 so as to reciprocate therewith upon actuation of the ratchet device 13. The jaws 83 are mutually spaced apart by the spacing of adjacent carriers 10 on the chain 11 and the jaws 83 nearer to the end jaw 81 is spaced from the latter by similar distance. The jaws 83 are mounted to be swung upwardly by the operation of a piston and cylinder assembly 84.

Figure 2:
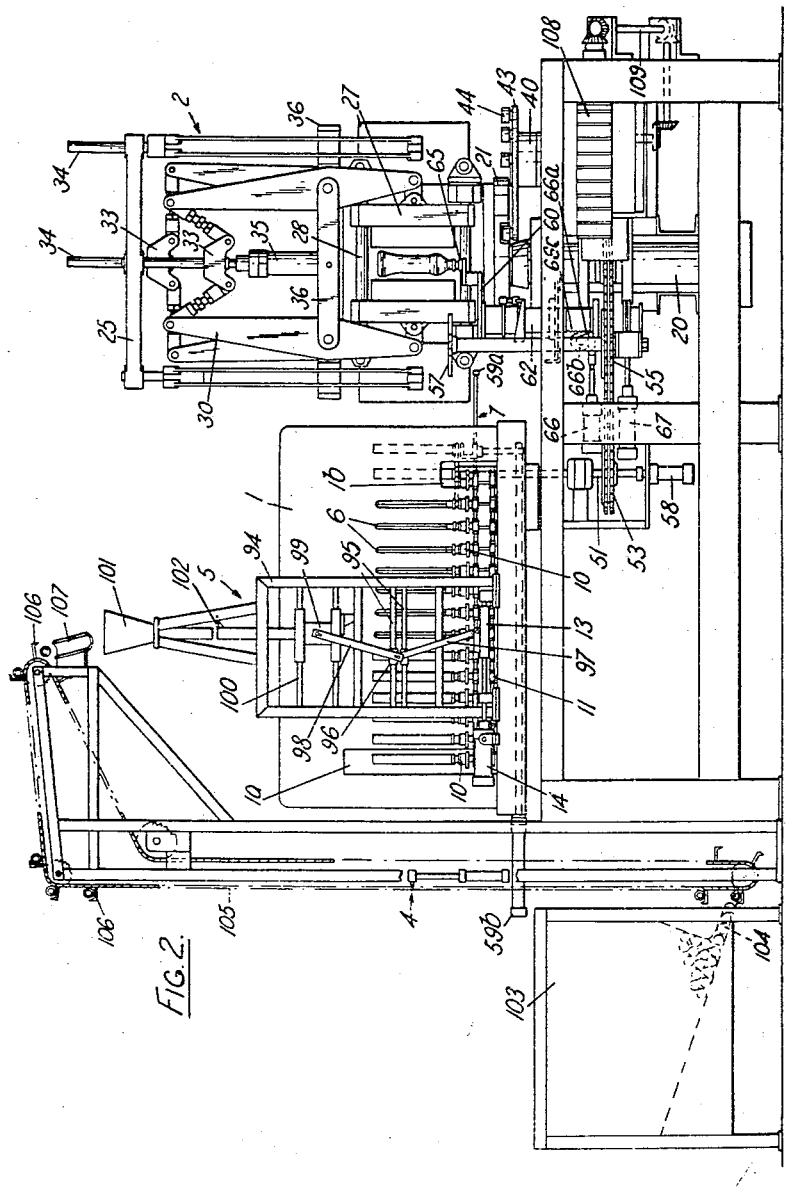
FIGURE 2 is a somewhat diagrammatic front elevation of the apparatus of FIGURE 1.

The operation of piston and cylinder assemblies 82 and 84 is so co-ordinated with the operation of the piston and cylinder assembly 14 actuating the ratchet device 13 that during a return stroke of the ratchet device 13 (i.e. to the right as seen in FIGURES 2 and 7) the jaws 81 are lowered and the jaws 83 are swung upwardly away from the guide 80. On the other hand, during a driving stroke of the ratchet device 13 (to the left) the jaws 81 are raised and the jaws 83 are swung into position over the guide 80 for engagement with mandrels in the guide. The arrangement is such that a mandrel carried by the star-wheel 57 after 270° indexing rotation thereof is withdrawn from the star-wheel and moved along the guide 80 by a distance corresponding with the interval between successive carriers 10 on the chain 11 as the latter is advanced by a corresponding distance through the action of the ratchet device 13. The successively withdrawn mandrels thus progress along the guide 80 until they reach the farther jaw 83 which is located over the chain 11 and is adapted to deposit a mandrel held by such jaw 83 in a carrier 10 of the chain 11.

The mandrel return assembly not only fulfils the function of returning mandrels from the star-wheel 57 to carriers 10 on the chain 11 but it is also adapted to remove any mandrel from which a moulded article has not been stripped by the unloader and stripper assembly previously described, and to replace such removal mandrel by another mandrel. It will be understood that in the operation of the apparatus it is possible for an imperfect moulded article to be produced; for instance the upper end of a heated tubing length may not be effectively nipped and sealed by closure of the mould assembly into which it is introduced, or it may have some imperfection which will prevent proper expansion of the tubing length into conformity with the mould configuration. In such case the tubing length will not be properly shaped nor cooled and the star-wheel 70 may easily fail to strip the improperly shaped tubing length from its mandrel.

In such case the improperly shaped tubing length will continue to be carried by its mandrel as this is moved by star wheel 57 into engagement with the first jaw 81 of the return and replacement assembly and subsequently moved stepwise along the guide 80. The presence of an improperly shaped article on a mandrel in the guide 80 is detected by a microswitch 85 as the article completes the first step of movement into the guide 80 and operation of switch 85 prepares an electric control circuit for operation during the next cycle of the ratchet device 13. Thus following the second step of movement, in the guide 80, of the mandrel to be rejected, a piston and cylinder assembly 86 is operated by said control circuit to thrust such mandrel out of the jaw 81 in which it is at that moment located and into a reject guide 87 extending forwardly at right angles from the guide 80. Movement of such rejected mandrel into the guide 87 trips a further microswitch 88 that controls the operation of a piston and cylinder assembly 89 to feed a replacement mandrel into the guide 80 following the next operating cycle of the ratchet device 13.

Replacement mandrels are stored in a guide 90 leading into a guide 91 extending forwardly from the guide 80 at right angles thereto and in alignment with the piston and cylinder assembly 89. Mandrels in the guide 90 are urged into the guide 91 one by one by a spring mechanism generally indicated at 92 and from the foregoing description and an inspection of FIGURE 7 it will be apparent that operation of piston and cylinder 89 will be effective to introduce a replacement mandrel from the guide 90 into the guide 80 in the position that would have been occupied by the rejected mandrel had this not, at the end of the preceding operation of the ratchet device 13, been thrust by the piston and cylinder assembly 86 into the reject guide 87. The latter is equipped near its extremity with a microswitch 93 which is tripped when the guide 87 becomes filled with rejected mandrels and actuates an indicator to advise the operator of the need to deal with the rejected mandrels in the guide 87 and to place a fresh supply of replacement mandrels in the guide 90.

As previously noted, the illustrated apparatus includes a loading device 5 for loading lengths of thermoplastic tubing on to successive mandrels 6 as these advance through the device 5. It should be understood that if the apparatus were operated with a long cycle time, it would be feasible to omit the loading device 5 and manually load the individual mandrels with tubing lengths. However, in the illustrated apparatus the loading device 5 performs automatic loading of the mandrels and it will be seen that this device 5 comprises a frame 94 spanning a portion of the run of chain 11 between the openings 1a and 1b of the oven, this frame 94 having a pair of horizontal guide rails 95 on which a block 96 is slidable. The block 96 is articulated by a link 97 to the ratchet device 13 so that the block 96 is constrained to move in synchronism with the device 13. The block 96 is also articulated by a link 98 to a vertical tubular guide 99 mounted for horizontal movement along guide rails 100 on the frame 94 so that the movement of the block 96 is transmitted to the guide 99 and the arrangement is such that the guide 99 is maintained in vertical alignment over a mandrel 6 throughout the movement of the latter during a driving stroke of the ratchet device 13.

The tubular guide 99 extends upwardly to the lower end of a funnel 101 that is positioned so as to be in alignment with the axis of the mandrel 6 that is beneath the guide 99 when the chain 11 is stationary. The upper end of the guide 99 has a lug 102 that moves under the lower end of funnel 101 as the guide 99 follows the movement of such mandrel during a driving stroke of the ratchet device 13.

It will be clear from the above description and from inspection of FIGURE 2 that a tubing length placed in funnel 101 will be prevented from falling into the guide 99 until such time as the latter is aligned beneath the lower end of the funnel 101, when such tubing length will be able to fall downwardly through the guide 99 and on to the mandrel 6 positioned thereunder. Should the tube length fail to descend to a position clear of guide 99 before the next driving stroke of the ratchet device 13 commences, the movement of the guide 99 with the mandrel concerned will maintain alignment of the guide 99 with this mandrel until the tubing length has descended clear of the guide 99.

Tubing lengths could be fed to the funnel 101 manually but in the illustrated apparatus the tube feeder 4 is provided to perform this operation automatically. The tube feeder 4 comprises a bin 103 in which a stock of tubing lengths is maintained, the tubing lengths being fed from bin 103 via an outlet 104 to an elevator belt 105 having pockets 106 at intervals thereon. Successive tubing lengths are carried by successive pockets 106 to a point above funnel 101 where they fall from the pockets 106 on to a chute 107 which leads them into the funnel 101. The advance of the belt 105 is effected in steps co-ordinated with the operation of the ratchet device 13 so that a tubing length is fed to the funnel 101 at the proper moment for descent through the latter and thence through guide 99 on to a mandrel 6.

The operation of the whole machine is basically controlled by a programme drum 108 carrying a number of cams and driven through shafting 109 from the gear box 42. The cams on the programme drum 108 actuate electrical contacts and pilot valves in the appropriate sequence and these contacts and pilot valves in turn control the various machine functions. In this foregoing description the operational sequences of the components of individual units of the apparatus have been described and it will be understood that these sequences are basically controlled by the programme drum 108 although in certain cases a particular sequence of operations is initiated by the programme drum 108 and thereafter continues with one operation following the preceding operation of the sequence at a time determined by the attainment of a chosen stage in such preceding operation.

However, reviewing the overall operation of the apparatus it is to be understood that for each indexing movement of the mould turret 2 there occurs an advance of the chain 11 by operation of the ratchet device 13, an operation of the mould loader 7, an operation of the mould unloader and mandrel stripper assembly 8 and an operation of the mandrel return and replacement assembly 9. Thus immediately following an indexing movement of the turret 2 a mould assembly 26 at the mould loading station is open and a loaded mandrel is fed to such assembly by the operation of the mould loader 7, this operation being followed by closure of the mould assembly 26. During closure of the mould assembly 26, air under pressure is applied to the associated nipple 45 to introduce such air into the tubing length on the mandrel. This application of air under pressure to the nipple 45 is controlled by the closing of the mould assembly and takes place just prior to full closure of the mould assembly since it has been found that in this way an improved weld line is achieved at the upper end of the tubing length where this is nipped in the mould. Also it is found that the application of air under pressure to the tubing length prior to full closure of the mould causes the upper part of the tubing length to commence expanding before the lower part of the tubing length, with the result that a more uniform wall thickness is obtained in the moulded article. In FIGURE 5 the dotted outline 110 illustrates the outline of a tubing length at approximately the instant at which the mould 29 becomes fully closed.

Following full closure of the mould assembly at the loading station, the turret 2 indexes. The next mould assembly at the moulding station is loaded as above described with repetition of the described cycle.

During the third indexing movement of a mould assembly from the loading station, such mould assembly approaches the unloading station and the supply of compressed air via the nipple 45 to the tubing length therein is cut off and air exhausted from such tubing length. Thereafter the mould assembly commences to open immediately prior to the turret 2 coming to rest with such assembly at the unloading station. Unloading of this mould assembly then takes place in the manner previously described, the mould assembly remaining open whilst the next indexing movement of the turret occurs to carry such mould assembly to the loading station.

It will therefore be understood that when the apparatus is in operation a moulded article is produced for every 90° of rotation of the turret 2, that is four articles are produced in each complete rotation of the turret. The apparatus may, however, include control means for disabling the ratchet device 13 on one, two or three consecutive indexing movements of the turret 2 so that a mandrel carrying a heated tubing length is loaded only into three, two or one selected mould assemblies of the turret 2.

By the operation of such control means it may thus be arranged for the apparatus to produce one, two or three moulded articles for each complete rotation of the turret 2. This facility may, for instance, be desirable when only a short run of a particular form of moulded article is to be produced and the expense of making a full set of four moulds 29 for that article is not justified by the total number of articles to be produced.

Desirably the apparatus includes manual control means for the individual functional components, whereby these may be operated individually for testing, servicing and adjustment purposes.

It should be noted that the satisfactory formation of certain moulded articles may be best accomplished with non-uniform heating of the tubing lengths by the oven 1, so that different portions of a tubing length loaded into a mould are at different temperatures and expand with different degrees of ease under the applied fluid pressure. Such non-uniform heating of the tubing lengths may be readily achieved by suitable control of temperature in different regions of the oven 1, e.g. by the use of baffles shielding parts of each tubing length from the full flow of the atmosphere within the oven.

The apparatus described and illustrated may be adapted to the formation of multi-walled articles by loading the mandrels 6 with tubing lengths consisting of interfitted tubes of different thermoplastic materials; such tubing lengths could be built up on the mandrels by successive loading of the individual tubes on to a mandrel or, without change of the feeding arrangements described the apparatus could produce multi-walled articles from composite tubing lengths placed in the bin 103.

I claim:

1. Apparatus for forming hollow articles from thermoplastic material, comprising means for heating a series of discrete lengths of thermoplastic tubing to molding temperature, a mold and means for transferring such heated tubing lengths successively to said mold, means for introducing fluid under pressure into a tubing length within said mold to expand said tubing length into conformity with the mold configuration, means for removing the expanded tubing length from said mold following cooling of the expanded tubing length therein, a series of mandrels for supporting individual discrete tubing lengths, said heating means comprising an oven and means for advancing said mandrels progressively through said oven to said transferring means, said mandrel advancing means comprising an endless conveyor having mandrel carriers at intervals along its length, said mandrel carriers detachably supporting said mandrels, said transferring means being effective to remove successive mandrels bearing heated tubing lengths from said carriers and to transfer said mandrels to said mold.

2. Apparatus according to claim 1, wherein said transferring means comprise a star-wheel having jaws to receive a mandrel fed thereto by advance of the conveyor, a shuttle for transferring mandrels from the star-wheel to the mold, and means for moving said star-wheel to cause a mandrel received thereby to be removed from the conveyor carrier and to be placed in said shuttle.

3. Apparatus according to claim 2, wherein said mold is adapted to receive a heated tubing length on its mandrel and to effect expansion and cooling of the tubing length whilst on its mandrel, the apparatus further including means for removing a mandrel with its expanded and cooled tubing length as a molded article from the mold and for thereafter stripping such article from the mandrel, and means for replacing said mandrel in a carrier on said conveyor.

4. Apparatus according to claim 3, wherein said removing and stripper means comprise a mold unloader for removing a mandrel and molded article from the mold, a pair of intermeshing star-wheels to which said mold unloader transfers a removed mandrel and molded article, one of said star-wheels having jaws to receive the mandrel and the other of said star-wheels being formed to engage the molded article on the mandrel, and means for relatively moving said star-wheels in the direction of the mandrel axis to cause stripping of the article from the mandrel.

5. Apparatus according to claim 4, including means for relatively rotating said pair of star-wheels to effect conveyance of the stripped article to a discharge location and conveyance of the mandrel to said means for replacing the mandrel in a conveyor carrier.

6. Apparatus according to claim 5, wherein said starwheel engaging the molded article includes article-retaining means adapted to grip an article fed thereto during said stripping movement of the star-wheel and during rotation thereof to convey the article to the discharge location where such article is released therefrom.

7. Apparatus according to claim 6, wherein said mandrel replacing means includes a detecting means responsive to the presence of a defective tubing length on a mandrel fed to such replacing means, said detecting means acting to reject such mandrel and to substitute a tubing-free mandrel therefor.

8. Apparatus according to claim 7, wherein said mandrel replacing means comprise a guide and means for advancing of a mandrel therealong, a reject channel communicating with said guide and means for displacing a mandrel from the guide to said reject channel, a storage channel for substitute mandrels communicating with said guide, and means responsive to the displacement of a mandrel from the guide into the reject channel to feed a substitute mandrel from said storage channel into said guide.

9. Apparatus according to claim 8, wherein said mandrel-advancing means comprise jaws disposed along said guide at intervals corresponding with the spacing of successive mandrel carriers on said conveyor and means for moving said jaws in timed relation to the advance of the conveyor to move a mandrel in said guide from one jaw to the next in phase with the advance of the conveyor, said reject channel communicating with the guide adjacent to one said jaw and said storage channel communicating with the guide adjacent to another said jaw spaced from said one jaw in the direction of mandrel advance along the guide.

10. Apparatus according to claim 1, including a plurality of molds adapted sequentially to receive successive tubing lengths of said series.

11. Apparatus according to claim 10, including a turret mounting said molds in a circle, and means for indexing the turret to present said molds sequentially to said transferring means for the reception of heated tubing lengths.

References Cited in the file of this patent
UNITED STATES PATENTS

| | | |
|---|---|---|
| 2,401,564 | Hofmann | June 4, 1946 |
| 2,781,551 | Richerod | Feb. 19, 1957 |
| 2,792,593 | Hardgrove | May 21, 1957 |